(12) United States Patent
Chi et al.

(10) Patent No.: US 12,476,682 B2
(45) Date of Patent: Nov. 18, 2025

(54) METHOD AND APPARATUS FOR OAM BEAM COMMUNICATION

(71) Applicant: BEIJING XIAOMI MOBILE SOFTWARE CO., LTD., Beijing (CN)

(72) Inventors: Liangang Chi, Beijing (CN); Feng Zheng, Beijing (CN); Siwei Ji, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 30 days.

(21) Appl. No.: 18/684,636

(22) PCT Filed: Aug. 19, 2021

(86) PCT No.: PCT/CN2021/113640
§ 371 (c)(1),
(2) Date: Feb. 16, 2024

(87) PCT Pub. No.: WO2023/019532
PCT Pub. Date: Feb. 23, 2023

(65) Prior Publication Data
US 2024/0372586 A1    Nov. 7, 2024

(51) Int. Cl.
*H04L 5/12*        (2006.01)
*H04B 7/06*        (2006.01)

(52) U.S. Cl.
CPC ......... *H04B 7/0617* (2013.01); *H04B 7/0639* (2013.01); *H04B 7/0695* (2013.01)

(58) Field of Classification Search
CPC ... H04B 7/0617; H04B 7/0639; H04B 7/0695
USPC ................ 375/262, 260, 259, 219, 295, 316
See application file for complete search history.

(56) References Cited

U.S. PATENT DOCUMENTS

| | | | |
|---|---|---|---|
| 2019/0165849 A1 | 5/2019 | Ashrafi et al. | |
| 2022/0408274 A1* | 12/2022 | Horn | H04W 16/28 |
| 2023/0096819 A1* | 3/2023 | Ni | H04B 7/0639 |
| | | | 343/702 |
| 2023/0171056 A1* | 6/2023 | Huang | H04B 7/0617 |
| | | | 370/328 |

FOREIGN PATENT DOCUMENTS

| | | |
|---|---|---|
| CN | 111133698 A | 5/2020 |
| CN | 111133697 A | 5/2021 |

OTHER PUBLICATIONS

European Patent Application No. 21953775.0 Search Report dated Sep. 12, 2024, 9 pages.
PCT/CN2021/113640 International Search Report dated Mar. 29, 2022, 2 pages.

* cited by examiner

*Primary Examiner* — Zewdu A Kassa
(74) *Attorney, Agent, or Firm* — Cozen O'Connor (57) ABSTRACT

A method for orbital angular momentum (OAM) beam communication includes: transmitting a reference signal (RS) to a receiver; receiving feedback information provided by the receiver based on the RS; determining a weight vector corresponding to the transmitter based on the information, in which, the weight vector adjusts a divergence angle of an OAM beam transmitted by the transmitter; determining an OAM signal to be transmitted, and adjusting a divergence angle of the OAM signal to be transmitted based on the weight vector to obtain an adjusted OAM beam; transmitting the adjusted OAM beam.

15 Claims, 6 Drawing Sheets

METHOD AND APPARATUS FOR OAM BEAM COMMUNICATION

CROSS REFERENCE TO RELATED APPLICATION

This application is a US national phase application of International Application No. PCT/CN2021/113640, filed on Aug. 19, 2021, the content of which is incorporated herein by reference.

TECHNICAL FIELD

The disclosure relates to a field of communication technologies, and particularly to a method and an apparatus for orbital angular momentum (OAM) beam communication.

BACKGROUND

For solving a problem of spectrum resource shortage in a wireless communication network, an OAM (Orbital Angular Momentum) communication system is generally established using UCA (Uniform Circular Array). In the OAM communication system, different modal properties of OAM beams may correspond to different divergence angles, and optimal receiving radiuses for different divergence angles are different. Therefore, when a terminal device receives a plurality of OAM beams with different divergence angles by using one receiving array, a reception quality of the OAM beams may be affected.

SUMMARY

In an aspect, an embodiment of the present disclosure provides a method for orbital angular momentum (OAM) beam communication, performed by a transmitter. The method includes:
  transmitting a reference signal (RS) to a receiver;
  receiving feedback information provided by the receiver based on the RS;
  determining a weight vector corresponding to the transmitter based on the information, in which, the weight vector adjusts a divergence angle of an OAM beam transmitted by the transmitter;
  determining an OAM signal to be transmitted, and adjusting a divergence angle of the OAM signal to be transmitted based on the weight vector to obtain an adjusted OAM beam;
  transmitting the adjusted OAM beam.

In another aspect, an embodiment of the present disclosure provides a method for orbital angular momentum (OAM) beam communication, performed by a receiver. The method includes:
  receiving a reference signal (RS) transmitted by a transmitter;
  providing feedback information to the transmitter based on the RS;
  receiving an adjusted OAM beam transmitted by the transmitter.

In yet another aspect, an embodiment of the present disclosure provides an apparatus for orbital angular momentum (OAM) beam communication. The apparatus includes:
  a transceiver; a memory; a processor, coupled to the transceiver and the memory respectively, in which, the processor is configured:
  transmit a reference signal (RS) to a receiver;
  receive feedback information provided by the receiver based on the RS;
  determine a weight vector corresponding to the transmitter based on the information, in which, the weight vector adjusts a divergence angle of an OAM beam transmitted by the transmitter;
  determine an OAM signal to be transmitted, and adjusting a divergence angle of the OAM signal to be transmitted based on the weight vector to obtain an adjusted OAM beam;
  transmit the adjusted OAM beam.

BRIEF DESCRIPTION OF THE DRAWINGS

The above and/or additional aspects and advantages of the present disclosure will become obvious and easy to understand from the following description of the embodiments in conjunction with the accompanying drawings.

DETAILED DESCRIPTION

The example embodiments will be described, and examples thereof are shown in the accompanying drawings. When the following descriptions refer to the accompanying drawings, same numbers in different drawings represent same or similar elements unless otherwise indicated. The implementations described in the following exemplary embodiments do not represent all implementations consistent with embodiments of the present disclosure. Rather, they are merely examples of apparatuses and methods consistent with some aspects of the disclosure as detailed in the appended claims.

The terms described in the embodiments of the present disclosure are only for the purpose of describing specific embodiments and are not intended to limit the embodiments of the present disclosure. The singular forms "a", "the" used in the embodiments of the disclosure and the appended claim are also intended to include plural forms, unless the context clearly indicates otherwise. It should also be understood that the term "and/or" used in the present disclosure means and includes any or all possible combinations of one or more associated listed items.

It should be understood that, although the terms first, second, third, etc. may be used in embodiments of the present disclosure to describe various information, such information shall not be limited to these terms. These terms are only used to distinguish the same category of information. For example, subject to the scope of embodiments of the present disclosure, first information may also be referred to as second information, and similarly, second information may also be referred to as first information. It depends on the context. For example, the word "in case of", "if" as used herein may be interpreted as "in a case that" or "when" or "in response to determining".

The embodiments of the present disclosure are described below. Examples of the embodiments are shown in the accompanying drawing, in which the constant same or similar labels indicate the same or similar elements. Embodiments described herein with reference to drawings are explanatory, serve to explain the disclosure, and are not construed to limit embodiment of the disclosure.

In related arts, method one is generally that UCAs are set at both the transmitter and receiver, where receiving arrays correspond transmitting arrays one by one, and a receiving radius of each receiving array is as an optimal receiving radius corresponding to a certain divergence angle to receive an OAM beam under this divergence angle. Method two is generally that a transmitting UCA is set at the transmitter and one receiving array is set at the receiver, the transmitting UCA is optimized based on different OAM modals to achieve transmitting based on a same divergence angle under different OAM modals.

However, in the method one, the divergence angle of the OAM beam will change when a transmitting distance changes, which may affect a reception quality of the OAM beam. The method two cannot control variation of the divergence angle in a radial direction, which may also affect the reception quality of the OAM beam.

In a method for OAM beam communication provided in an embodiment of the present disclosure, a transmitter may send a RS to a receiver, and then receive feedback information provided by the receiver based on the RS. The transmitter determines a weight vector corresponding to the transmitter based on the received information, and adjusts a divergence angle of an OAM signal to be transmitted based on the weight vector to obtain an adjusted OAM beam, and then transmits the adjusted OAM beam to the receiver. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches a receiving array at the receiver. As such, even if the receiver and the transmitter are in a mobile scenario, or the transmitter transmits OAM signals of different modal, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

A method and an apparatus for orbital angular momentum (OAM) beam communication, a user equipment, and a storage medium provided in the present disclosure are described below with reference to the accompanying drawings.

Figure 1:
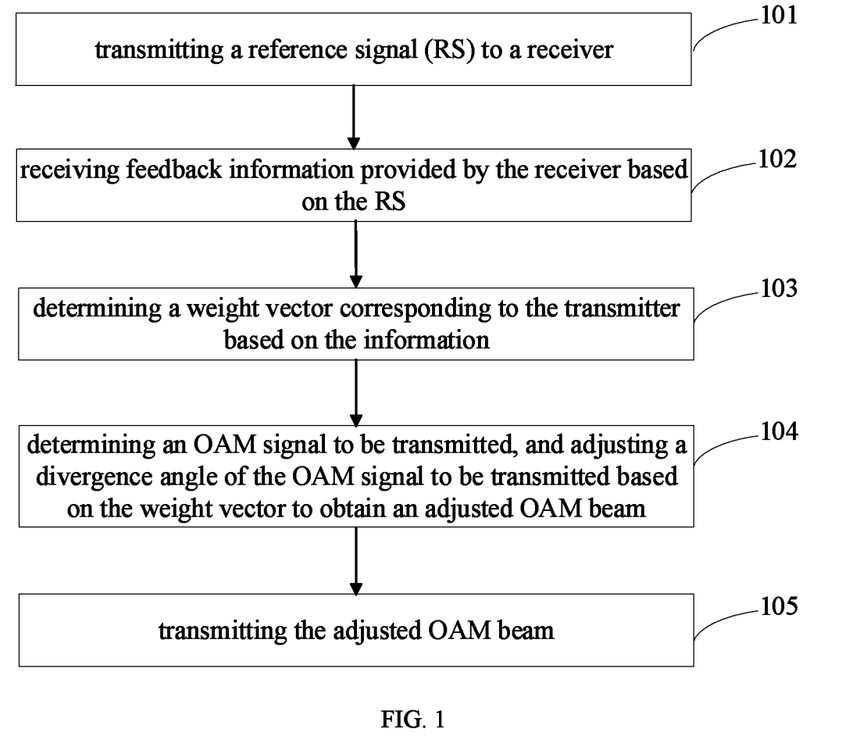
FIG. 1 is flowchart illustrating a method for OAM beam communication provided in an embodiment of the present disclosure.

FIG. 1 is flowchart illustrating a method for OAM beam communication provided in an embodiment of the present disclosure. The method is performed by a transmitter. As illustrated in FIG. 1, the method for OAM beam communication may include the following steps.

At step 101, a RS (reference signal) is transmitted to a receiver.

It should be noted that the transmitter may be either a base station or a user equipment (UE). And the transmitter in an embodiment of the present disclosure may be any UE or any base station. The UE may refer to a device that provides voice and/or data connectivity for a user. The UE may communicate with one or more core networks via a radio access network (RAN). The UE may be an internet of things (IoT) terminal such as a sensor device and a mobile phone (or referred to as a cellular phone), and a computer having an IoT terminal such as a fixed, portable, compact, handheld, computer built-in or vehicle apparatus. For example, a station (STA), a subscriber unit, a subscriber station, a mobile station, a mobile, a remote station, an access point, a remote terminal, an access terminal, a user terminal or a user agent. Alternatively, the UE may be a device of an unmanned aerial vehicle (UAV). Alternatively, the UE may be a vehicle device, and for example, may be a vehicle computer with a wireless communication function, or a wireless terminal externally connected to a vehicle computer. Alternatively, the UE may be a roadside device, and for example, may be a streetlamp, a signal lamp or other roadside device with a wireless communication function.

In an embodiment of the present disclosure, the transmitter may be provided with a transmitting UCA. The transmitting UCA may include at least one concentric circular array, and radiuses of different circular arrays are different. And, in an embodiment of the present disclosure, one circular array in the transmitting UCA may be determined as a transmitting array to transmit an OAM beam.

At step 102, feedback information provided by the receiver based on the RS is received.

In an embodiment of the present disclosure, the feedback information provided by the receiver may include a communication distance between the transmitter and the receiver and a receiving radius of a receiving array at the receiver.

In another embodiment of the present disclosure, the feedback information provided by the receiver may include an index value of a weight vector corresponding to the transmitter. In an embodiment of the present disclosure, the weight vector adjusts a divergence angle of an OAM beam transmitted by the transmitter.

At step 103, a weight vector corresponding to the transmitter is determined based on the information.

In an embodiment of the present disclosure, the weight vector determined by the transmitter may be an optimal weight vector matching the receiving array at the receiver.

Specifically, in an embodiment of the present disclosure, the weight vector determined by the transmitter may have following capability: after adjusting the divergence angle of the OAM beam transmitted by the transmitter using this weight vector, a ring with a strongest energy in the adjusted OAM beam can match a ring composed of the receiving array at the receiver, that is, causing that a radius of the ring with the strongest energy in the adjusted OAM beam can match a receiving radius of the receiving array.

Figure 1A:
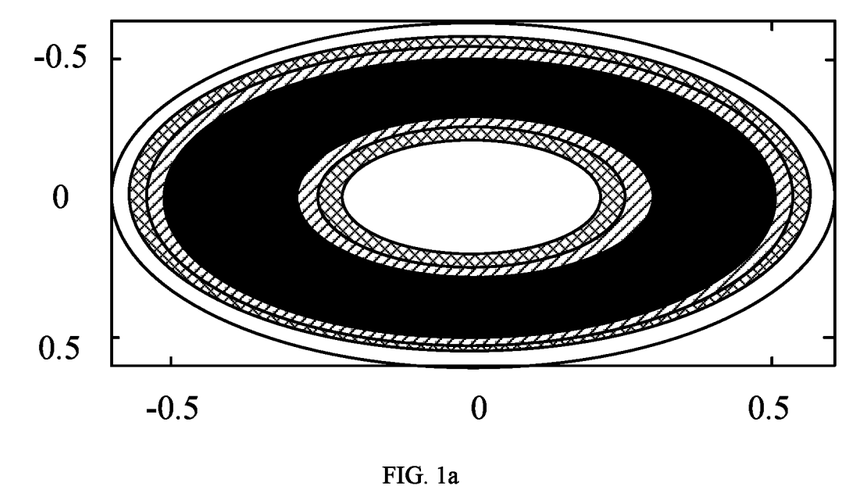
FIG. 1*a* is diagram illustrating a strength of an OAM beam provided in an embodiment of the present disclosure.

FIG. 1a is diagram illustrating a strength of an OAM beam provided in an embodiment of the present disclosure. As illustrated FIG. 1a, a black region represents a ring with the strongest energy in the OAM beam. In an embodiment of the present disclosure, it is to match the ring corresponding to the black region in the OAM beam with the ring composed of the receiving array.

In an embodiment of the present disclosure, the weight vector may specifically be a vector composed of weighting coefficients corresponding to respective transmitting arrays at the transmitter. A weighting coefficient corresponding to the mth transmitting array of the transmitter and an lth modal is $w_{l,m}$ where $$w_{l,m} = e^{j(m-1)\Delta\varphi_l}, l = -\left\lfloor\frac{N}{2}\right\rfloor, 0, 1, \ldots, \left\lfloor\frac{N}{2}\right\rfloor - 1 \cdot N$$

denotes a number of antennas of the transmitting array at the transmitter, φ is determined based on at least one of a communication distance between the transmitter and the receiver, a receiving radius of a receiving array at the receiver, or a modal of the transmitting array at the transmitter Further, in an embodiment of the present disclosure, the weighting coefficient may specifically include a magnitude and/or a phase.

At step 104, an OAM signal to be transmitted is determined, and a divergence angle of the OAM signal to be transmitted is adjusted based on the weight vector to obtain an adjusted OAM beam.

In an embodiment of the present disclosure, a method of obtaining the adjusted OAM beam may specifically include the following steps.

At step a, an actual transmitting signal of each antenna is determined based on the weight vector and a signal to be transmitted of each antenna of each transmitting array.

Specifically, in an embodiment of the present disclosure, the actual transmitting signal of each antenna may be determined by means of the following formula.

$$\widetilde{x_{m,n}} = \sum_{l=-\left\lfloor\frac{N}{2}\right\rfloor}^{\left\lfloor\frac{N}{2}\right\rfloor-1} w_{l,m} e^{\frac{jl2\pi n}{N}} x_l$$

where $\widetilde{x_{m,n}}$ denotes an actual transmitting signal corresponding to an nth antenna of an mth transmitting array at the transmitter, both m and n are positive integers; l denotes an OAM modal value, $$l = -\left\lfloor\frac{N}{2}\right\rfloor, 0, 1, \ldots, \left\lfloor\frac{N}{2}\right\rfloor - 1,$$

and N denotes a number of antennas of the transmitting array at the transmitter; $w_{l,m}$ denotes a weighting coefficient corresponding to the mth transmitting array of the transmitter and an lth modal, $w_{l,m} = e^{j(m-1)\Delta\varphi_l}$, the weight vector is a vector composed of weighting coefficients corresponding to respective transmitting arrays at the transmitter;

$$e^{\frac{jl2\pi n}{N}}$$

denotes an OAM modulation coefficient of the nth antenna, and $x_l$ denotes a data signal to be transmitted;

$$e^{\frac{jl2\pi n}{N}} x_l$$

denotes a signal to be transmitted on the nth antenna of the mth transmitting array obtained by multiplying the nth antenna of the mth transmitting array by the OAM modulation coefficient under the lth modal.

At step b, the adjusted OAM beam is generated by superimposing based on the actual transmitting signal of each antenna.

At step 105, the adjusted OAM beam is transmitted.

In summary, in the method for OAM beam communication provided in an embodiment of the present disclosure, the transmitter may send the RS to the receiver, and then receive the feedback information provided by the receiver based on the RS. The transmitter determines the weight vector corresponding to the transmitter based on the received information, and adjusts the divergence angle of the OAM signal to be transmitted based on the weight vector to obtain the adjusted OAM beam, and then transmits the adjusted OAM beam to the receiver. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

Figure 2:
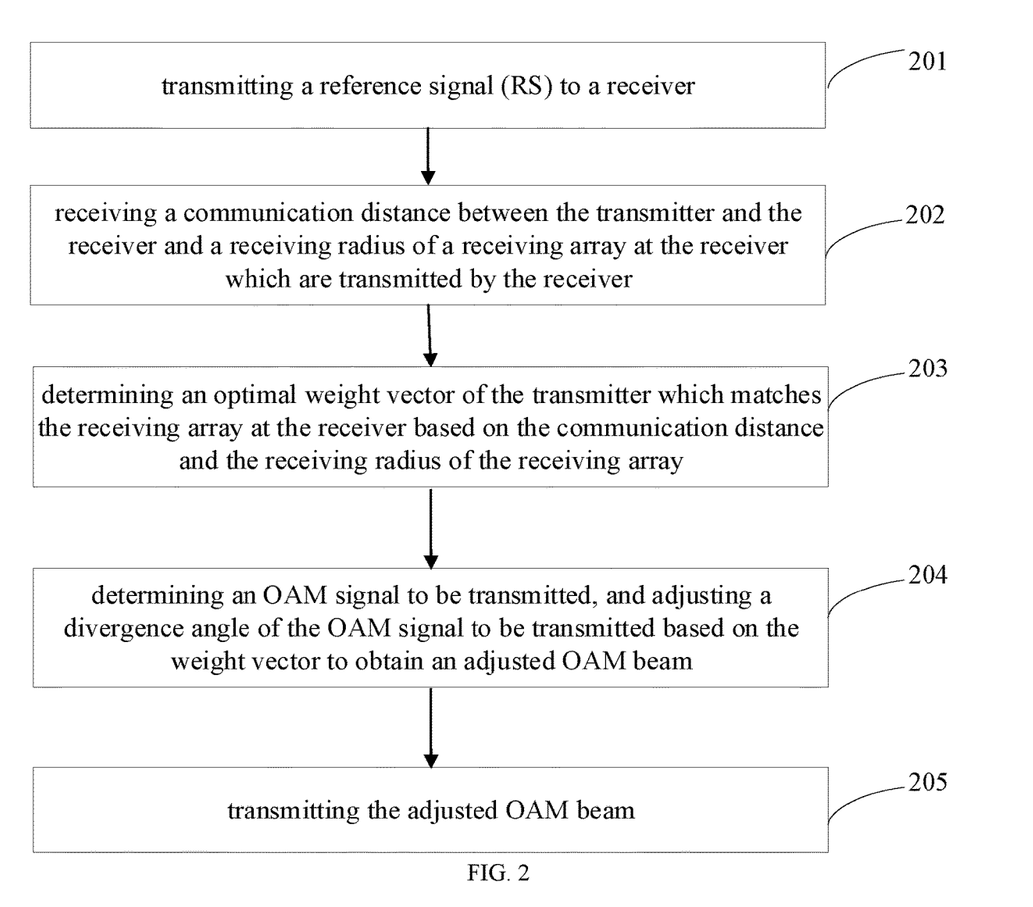
FIG. 2 is flowchart illustrating a method for OAM beam communication provided in another embodiment of the present disclosure.

FIG. 2 is flowchart illustrating a method for OAM beam communication provided in another embodiment of the present disclosure. The method is performed by a transmitter. As illustrated in FIG. 2, the method for OAM beam communication may include the following steps.

At step 201, a RS (reference signal) is transmitted to a receiver.

A detailed introduction to the transmitter can refer to relevant introductions in the above embodiment, which will not be repeated in an embodiment of the present disclosure.

At step 202, a communication distance between the transmitter and the receiver and a receiving radius of a receiving array at the receiver which are transmitted by the receiver are received.

In an embodiment of the present disclosure, after receiving the RS sent by the transmitter, the receiver may estimate the communication distance between the transmitter and the receiver, and transmit the communication distance and the receiving radius of the receiving array to the transmitter.

At step 203, an optimal weight vector of the transmitter which matches the receiving array at the receiver is determined based on the communication distance and the receiving radius of the receiving array.

In an embodiment of the present disclosure, a method of determining the optimal weight vector matching the receiving array based on the communication distance and the receiving radius by the transmitter may include: determining an optimal angle $\varphi_l$ corresponding to each transmitting array under a current modal based on the communication distance, the receiving radius, and the modal value of the transmitting array, determining an optimal weighting coefficient $w_{l,m}$ corresponding to an mth transmitting array of the transmitter and an lth modal based on the optimal angle $\varphi_l$ and the current modal l of each transmitting array, where $w_{l,m}=e^{j(m-1)\Delta\varphi_l}$, then determining a vector composed of the optimal weighting coefficients corresponding to respective transmitting arrays as the optimal weight vector matching the receiving array.

Other detailed introductions to the weight vector can refer to description in the above embodiment, which will not be repeated in an embodiment of the present disclosure.

At step 204, an OAM signal to be transmitted is determined, and a divergence angle of the OAM signal to be transmitted is adjusted based on the weight vector to obtain an adjusted OAM beam.

At step 205, the adjusted OAM beam is transmitted.

Detailed introductions to the steps 204 to 205 can refer to relevant introductions in the above embodiment, which will not be repeated in an embodiment of the present disclosure.

In summary, in the method for OAM beam communication provided in an embodiment of the present disclosure, the transmitter may send the RS to the receiver, and then receive the feedback information provided by the receiver based on the RS. The transmitter determines the weight vector corresponding to the transmitter based on the received information, and adjusts the divergence angle of the OAM signal to be transmitted based on the weight vector to obtain the adjusted OAM beam, and then transmits the adjusted OAM beam to the receiver. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

Figure 3:
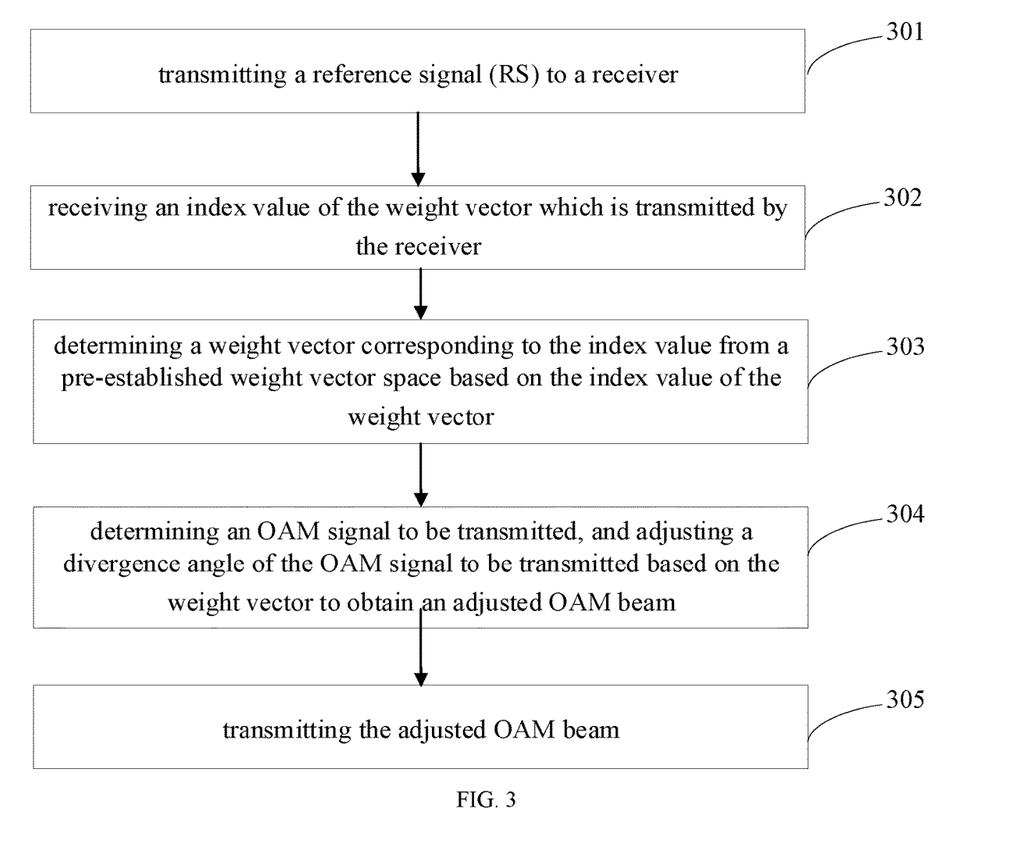
FIG. 3 is flowchart illustrating a method for OAM beam communication provided in yet another embodiment of the present disclosure.

FIG. 3 is flowchart illustrating a method for OAM beam communication provided in yet another embodiment of the present disclosure. The method is performed by a transmitter. As illustrated in FIG. 3, the method for OAM beam communication may include the following steps.

At step 301, a RS (reference signal) is transmitted to a receiver.

At step 302, an index value of a weight vector corresponding to the transmitter which is transmitted by the receiver is received.

It is noted that, in an embodiment of the present disclosure, the transmitter may pre-establish a weight vector space. The weight vector space may include: at least one weight vector corresponding to the transmitter under the receiving radius of the receiving array at the receiver, and an index value corresponding to each weight vector. In an embodiment of the present disclosure, the receiver and the transmitter share the weight vector space.

In an embodiment of the present disclosure, after receiving the RS transmitted by the transmitter, the receiver may first determine a current modal l of each transmitting array at the transmitter based the received RS, and then determine a communication distance between the transmitter and the receiver, determine an optimal angle $\varphi_l$ corresponding to each transmitting array based on the current modal l of each transmitting array, the communication distance, the receiving radius of the receiving array, determine an optimal weighting coefficient $w_{l,m}$ corresponding to an mth transmitting array of the transmitter and an lth modal under the receiving radius of the receiving array at the receiver, from the weight vector space, based on the optimal angle $\varphi_l$ and the current modal l of the mth transmitting array, where $w_{l,m}=e^{j(m-1)\Delta\varphi_l}$, then determine a vector composed of the optimal weighting coefficients corresponding to respective transmitting arrays as the optimal weight vector matching the receiving array, and transmit the index value of the optimal weight vector to the transmitter.

At step 303, a weight vector corresponding to the index value from a pre-established weight vector space is determined based on the index value of the weight vector.

At step 304, an OAM signal to be transmitted is determined, and a divergence angle of the OAM signal to be transmitted is adjusted based on the weight vector to obtain an adjusted OAM beam.

At step 305, the adjusted OAM beam is transmitted.

Detailed introductions to the steps 304 to 305 can refer to relevant introductions in the above embodiment, which will not be repeated in an embodiment of the present disclosure.

In summary, in the method for OAM beam communication provided in an embodiment of the present disclosure, the transmitter may send the RS to the receiver, and then receive the feedback information provided by the receiver based on the RS. The transmitter determines the weight vector corresponding to the transmitter based on the received information, and adjusts the divergence angle of the OAM signal to be transmitted based on the weight vector to obtain the adjusted OAM beam, and then transmits the adjusted OAM beam to the receiver. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

Figure 4:
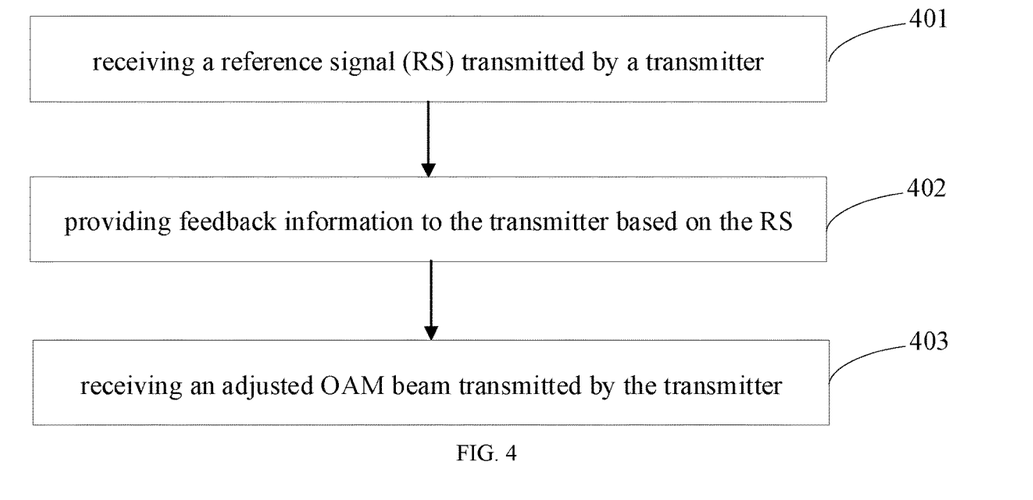
FIG. 4 is flowchart illustrating a method for OAM beam communication provided in still another embodiment of the present disclosure.

FIG. 4 is flowchart illustrating a method for OAM beam communication provided in still another embodiment of the present disclosure. The method is performed by a receiver. As illustrated in FIG. 4, the method for OAM beam communication may include the following steps.

At step 401, a reference signal (RS) transmitted by a transmitter is received.

In an embodiment of the present disclosure, the receiver may be either a UE or a base station. It should be noted that when the transmitter is the UE, the receiver can be the base station; When the transmitter is the base station, the receiver can be the UE.

At step 402, feedback information is provided to the transmitter based on the RS.

In an embodiment of the present disclosure, the feedback information provided by the receiver to the transmitter may include a communication distance between the transmitter and the receiver and a receiving radius of a receiving array at the receiver.

In another embodiment of the present disclosure, the feedback information provided by the receiver to the transmitter may include an index value of a weight vector corresponding to the transmitter. In an embodiment of the present disclosure, the weight vector is configured, for the transmitter, to adjust a divergence angle of an OAM beam transmitted by the transmitter. In an embodiment of the present disclosure, the index value of the weight vector fed back from the receiver to the transmitter is specifically the index value of the optimal weight vector corresponding to the transmitter under the receiving radius of the receiving array at the receiver. Relevant introductions to the weight vector can refer to description in the above embodiment, which will not be repeated in an embodiment of the present disclosure.

Furthermore, in an embodiment of the present disclosure, after the receiver provides the feedback information to the transmitter based on the RS, the transmitter may determine the weight vector corresponding to the transmitter based on the received information, adjust a divergence angle of an OAM signal to be transmitted based on the weight vector to obtain an adjusted OAM beam, and transmit the adjusted OAM beam to the receiver.

At step 403, an adjusted OAM beam transmitted by the transmitter is received.

In summary, in the method for OAM beam communication provided in an embodiment of the present disclosure, the receiver may receive the RS transmitted by the transmitter, and then provides the feedback information to the transmitter based on the RS, and receives the adjusted OAM beam transmitted by the transmitter. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

Figure 5:
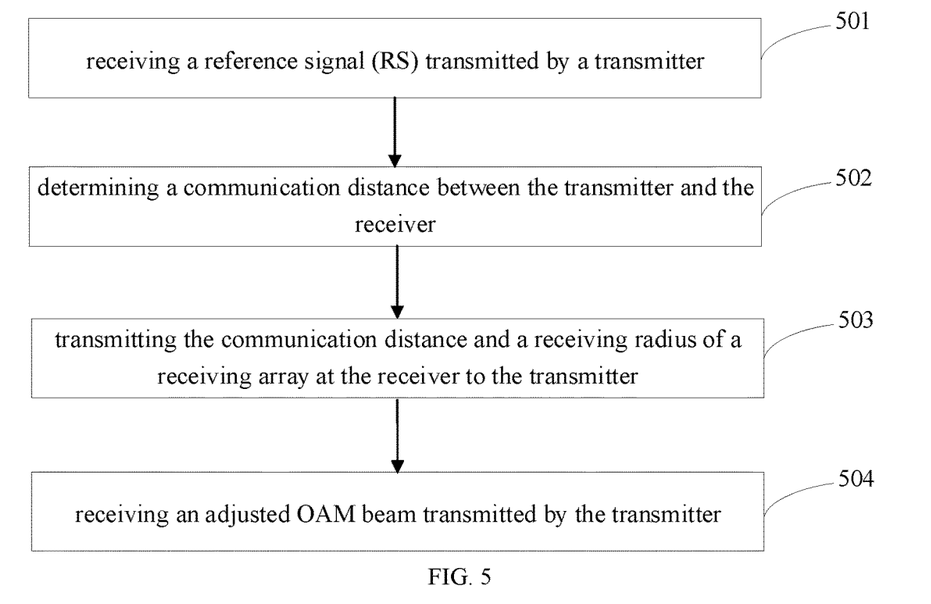
FIG. 5 is flowchart illustrating a method for OAM beam communication provided in still another embodiment of the present disclosure.

FIG. 5 is flowchart illustrating a method for OAM beam communication provided in still another embodiment of the present disclosure. The method is performed by a receiver. As illustrated in FIG. 5, the method for OAM beam communication may include the following steps.

At step 501, a reference signal (RS) transmitted by a transmitter is received.

At step 502, a communication distance between the transmitter and the receiver is determined.

At step 503, the communication distance and a receiving radius of a receiving array at the receiver is transmitted to the transmitter.

At step 504, an adjusted OAM beam transmitted by the transmitter is received.

Detailed introductions to the steps 501 to 504 can refer to relevant introductions in the above embodiment, which will not be repeated in an embodiment of the present disclosure.

In summary, in the method for OAM beam communication provided in an embodiment of the present disclosure, the receiver may receive the RS transmitted by the transmitter, and then provides the feedback information to the transmitter based on the RS, and receives the adjusted OAM beam transmitted by the transmitter. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

Figure 6:
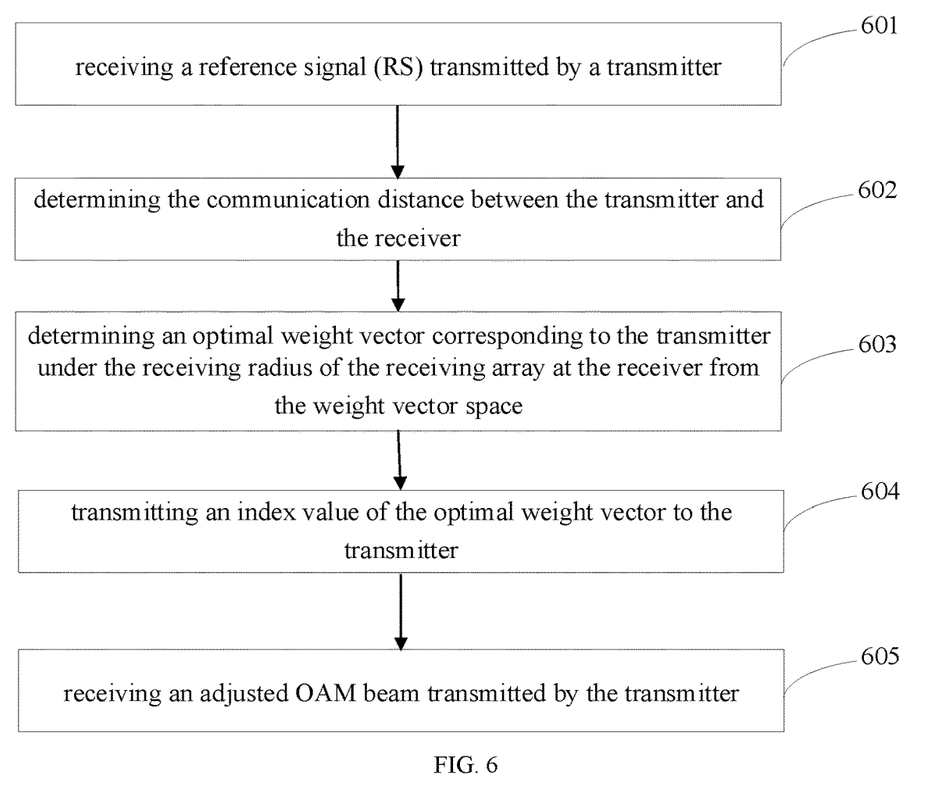
FIG. 6 is flowchart illustrating a method for OAM beam communication provided in still another embodiment of the present disclosure.

FIG. 6 is flowchart illustrating a method for OAM beam communication provided in still another embodiment of the present disclosure. The method is performed by a receiver. As illustrated in FIG. 6, the method for OAM beam communication may include the following steps.

At step 601, a reference signal (RS) transmitted by a transmitter is received.

At step 602, a communication distance between the transmitter and the receiver is determined.

At step 603, an optimal weight vector corresponding to the transmitter under the receiving radius of the receiving array at the receiver is determined from a weight vector space.

In an embodiment of the present disclosure, the weight vector space is the step 603 is a weight vector space pre-established by the transmitter. The weight vector space may include: at least one weight vector corresponding to the transmitter under the receiving radius of the receiving array at the receiver, and an index value corresponding to each weight vector. In an embodiment of the present disclosure, the receiver and the transmitter share the weight vector space. Relevant introductions to the weight vector space can refer to description in the above embodiment, which will not be repeated in an embodiment of the present disclosure.

Further, in an embodiment of the present disclosure, a method of determining the an optimal weight vector from the weight vector space may include that: the receiver determines a current modal l of each transmitting array at the transmitter based the RS transmitted by the transmitter, and then determines an optimal angle $\varphi_l$ corresponding to each transmitting array based on the current modal l of each transmitting array, the communication distance, the modal value of the receiving array, determines an optimal weighting coefficient $w_{l,m}$ corresponding to an mth transmitting array of the transmitter and an lth modal under the receiving radius of the receiving array at the receiver, from the weight vector space, based on the optimal angle $\varphi_l$ and the current modal l of the mth transmitting array, where $w_{l,m}=e^{j(m-1)\Delta\varphi_l}$, then determines a vector composed of optimal weighting coefficients corresponding to respective transmitting arrays as an optimal weight vector matching the receiving array, and transmits an index value of the optimal weight vector to the transmitter.

At step 604, an index value of the optimal weight vector is transmitted to the transmitter.

At step 605, an adjusted OAM beam transmitted by the transmitter is received.

Detailed introductions to the steps 604 to 605 can refer to relevant introductions in the above embodiment, which will not be repeated in an embodiment of the present disclosure.

In summary, in the method for OAM beam communication provided in an embodiment of the present disclosure, the receiver may receive the RS transmitted by the transmitter, and then provides the feedback information to the transmitter based on the RS, and receives the adjusted OAM beam transmitted by the transmitter. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

Figure 7:
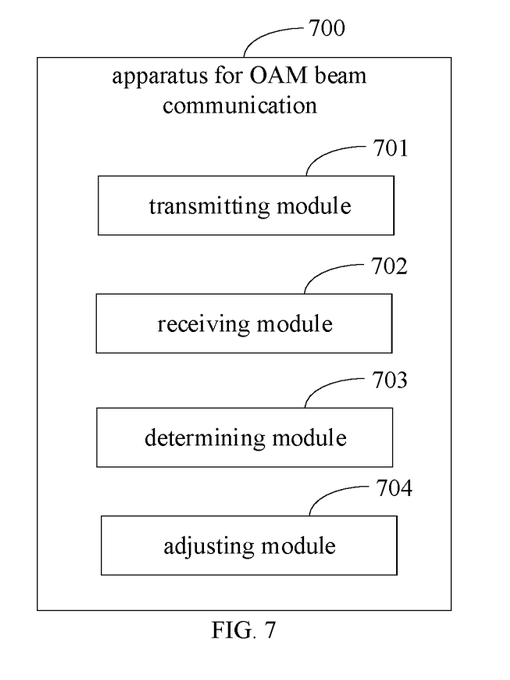
FIG. 7 is a block diagram illustrating a structure of an apparatus for OAM beam communication provided in an embodiment of the present disclosure.

FIG. 7 is a block diagram illustrating a structure of an apparatus for OAM beam communication provided in an embodiment of the present disclosure. As illustrated in FIG. 7, the apparatus 700 may include:

a transmitting module 701, configured to transmit a reference signal (RS) to a receiver;

a receiving module 702, configured to receive feedback information provided by the receiver based on the RS;

a determining module 703, configured to determine a weight vector corresponding to the transmitter based on the information, in which, the weight vector adjusts a divergence angle of an OAM beam transmitted by the transmitter;

an adjusting module 704, configured to determine an OAM signal to be transmitted, and adjust a divergence angle of the OAM signal to be transmitted based on the weight vector to obtain an adjusted OAM beam;

the transmitting module 701 being further configured to transmit the adjusted OAM beam.

In summary, in the apparatus for OAM beam communication provided in an embodiment of the present disclosure, the transmitter may send the RS to the receiver, and then receive the feedback information provided by the receiver based on the RS. The transmitter determines the weight vector corresponding to the transmitter based on the received information, and adjusts the divergence angle of the OAM signal to be transmitted based on the weight vector to obtain the adjusted OAM beam, and then transmits the adjusted OAM beam to the receiver. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

In an embodiment of the present disclosure, the adjusting module 704 is further configured to:
 determine an actual transmitting signal of each antenna based on the weight vector and a signal to be transmitted of each antenna of each transmitting array;
 generate the adjusted OAM beam by superimposing based on the actual transmitting signal of each antenna.

In an embodiment of the present disclosure, the adjusting module 704 is further configured to determine the actual transmitting signal of each antenna based on following formula:

$$\widetilde{x_{m,n}} = \sum_{l=-\lfloor \frac{N}{2} \rfloor}^{\lfloor \frac{N}{2} \rfloor - 1} w_{l,m} e^{\frac{jl2\pi n}{N}} x_l$$

where $\widetilde{x_{m,n}}$ denotes an actual transmitting signal corresponding to an nth antenna of an mth transmitting array at the transmitter, both m and n are positive integers; l denotes an OAM modal value, $$l = -\left\lfloor \frac{N}{2} \right\rfloor, 0, 1, \ldots, \left\lfloor \frac{N}{2} \right\rfloor - 1,$$

and N denotes a number of antennas of the transmitting array at the transmitter; $w_{l,m}$ denotes a weighting coefficient corresponding to the mth transmitting array of the transmitter and an lth modal, $w_{l,m} = e^{j(m-1)\Delta\varphi_l}$, $\varphi$ is determined based on at least one of a communication distance between the transmitter and the receiver, a receiving radius of a receiving array at the receiver, or a modal of the transmitting array at the transmitter, the weight vector is a vector composed of weighting coefficients corresponding to respective transmitting arrays at the transmitter;

$$e^{\frac{jl2\pi n}{N}}$$

denotes an OAM modulation coefficient of the nth antenna, and $x_l$ denotes a data signal to be transmitted.

Further, in another embodiment of the present disclosure, the receiving module 702 is configured to:
 receive a communication distance between the transmitter and the receiver and a receiving radius of a receiving array at the receiver which are transmitted by the receiver.

Further, in another embodiment of the present disclosure, the determining module 703 is configured to:
 determine an optimal weight vector of the transmitter which matches the receiving array at the receiver based on the communication distance and the receiving radius of the receiving array.

Further, in another embodiment of the present disclosure, the receiving module 702 is configured to:
 receive an index value of the weight vector which is transmitted by the receiver.

Further, in another embodiment of the present disclosure, the determining module 703 is configured to:
 determine a weight vector corresponding to the index value from a pre-established weight vector space based on the index value of the weight vector, in which, the weight vector space includes at least one weight vector corresponding to the transmitter under the receiving radius of the receiving array at the receiver, and an index value corresponding to each weight vector.

In another embodiment of the present disclosure, the receiver and the transmitter share the weight vector space.

In another embodiment of the present disclosure, the weighting coefficient includes a magnitude and/or a phase.

Figure 8:
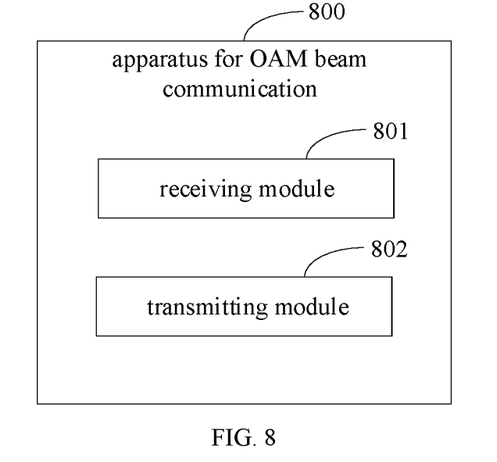
FIG. 8 is a block diagram illustrating a structure of an apparatus for OAM beam communication provided in another embodiment of the present disclosure.

FIG. 8 is a block diagram illustrating a structure of an apparatus for OAM beam communication provided in an embodiment of the present disclosure. As illustrated in FIG. 8, the apparatus 800 may include:
 a receiving module 801, configured to receive a reference signal (RS) transmitted by a transmitter;
 a transmitting module 802, configured to provide feedback information to the transmitter based on the RS;
 the receiving module 801 being further configured to receive an adjusted OAM beam transmitted by the transmitter.

In summary, in the method for OAM beam communication provided in an embodiment of the present disclosure, the receiver may receive the RS transmitted by the transmitter, and then provides the feedback information to the transmitter based on the RS, and receives the adjusted OAM beam transmitted by the transmitter. Therefore, in an embodiment of the present disclosure, before transmitting the OAM beam based on the OAM signal to be transmitted, the transmitter may determine the weight vector based on the feedback information from the receiver, and then adjust the divergence angle of the OAM signal to be transmitted based on the weight vector, to obtain the adjusted OAM beam, such that a ring with a strongest energy in the adjusted OAM beam matches the receiving array at the receiver. As such, even if the receiver and the transmitter are in a mobile scenario, or the transmitter transmits OAM signals of different modals, the ring with the strongest energy in the OAM beam sent by the transmitter each time may match the receiving array at the receiver, ensuring a reception quality of the OAM beam.

In addition, in an embodiment of the present disclosure, the divergence angle of the OAM beam sent by the transmitter will be adjusted by multiplying different weighting coefficients with transmitting arrays of different radiuses, which can ensure that the divergence angle of the adjusted OAM beam changes in a radial direction, further ensuring the reception quality of the OAM beam and effectively solving a problem of OAM beam communication performance degradation caused by changes of the modal and the distance of transmitting and receiving antenna arrays in coaxial and mobile scenarios, improving a communication performance of the OAM beam.

In an embodiment of the present disclosure, the transmitting module 802 is configured to:
  determine a communication distance between the transmitter and the receiver;
  transmit the communication distance and a receiving radius of a receiving array at the receiver to the transmitter.

In an embodiment of the present disclosure, the receiver and the transmitter share a weight vector space. The weight vector space includes at least one weight vector corresponding to the transmitter under the receiving radius of the receiving array at the receiver, the, and an index value corresponding to each weight vector.

The weight vector adjusts a divergence angle of an OAM beam transmitted by the transmitter, the weight vector is a vector composed of weighting coefficients corresponding to respective transmitting arrays at the transmitter, a weighting coefficient corresponding to the mth transmitting array of the transmitter and an lth modal is $w_{l,m}=e^{j(m-1)\Delta\varphi_l}$, N denotes a number of antennas of a transmitting array at the transmitter; $\varphi$ is determined based on at least one of a communication distance between the transmitter and the receiver, a receiving radius of the receiving array at the receiver, or a modal of the transmitting array at the transmitter.

Further, in another embodiment of the present disclosure, the transmitting module 802 is further configured to:
  determine the communication distance between the transmitter and the receiver;
  determine an optimal weight vector corresponding to the transmitter under the receiving radius of the receiving array at the receiver from the weight vector space based on the communication distance between the transmitter and the receiver and the receiving radius of the receiving array;
  transmit an index value of the optimal weight vector to the transmitter.

Further, in another embodiment of the present disclosure, the weighting coefficient includes a magnitude and/or a phase.

In order to implement the above embodiments, the present disclosure also provides a computer storage medium.

The computer storage medium provided in embodiments of the present disclosure is stored with an executable program. When the executable program is executed by a processor, the method for OAM beam communication according to any one of FIGS. 1 to 3 or FIGS. 4 to 6 is implemented.

In order to implement the above embodiments, the present disclosure also provides a computer program product. The computer program product includes a computer program. When the computer program is executed by a processor, t the method for OAM beam communication according to any one of FIGS. 1 to 3 or FIGS. 4 to 6 is implemented.

In addition, in order to implement the above embodiments, a computer program is also provided in the disclosure. When the program is executed by a processor, the method for OAM beam communication according to any one of FIGS. 1 to 3 or FIGS. 4 to 6 is implemented.

Figure 9:
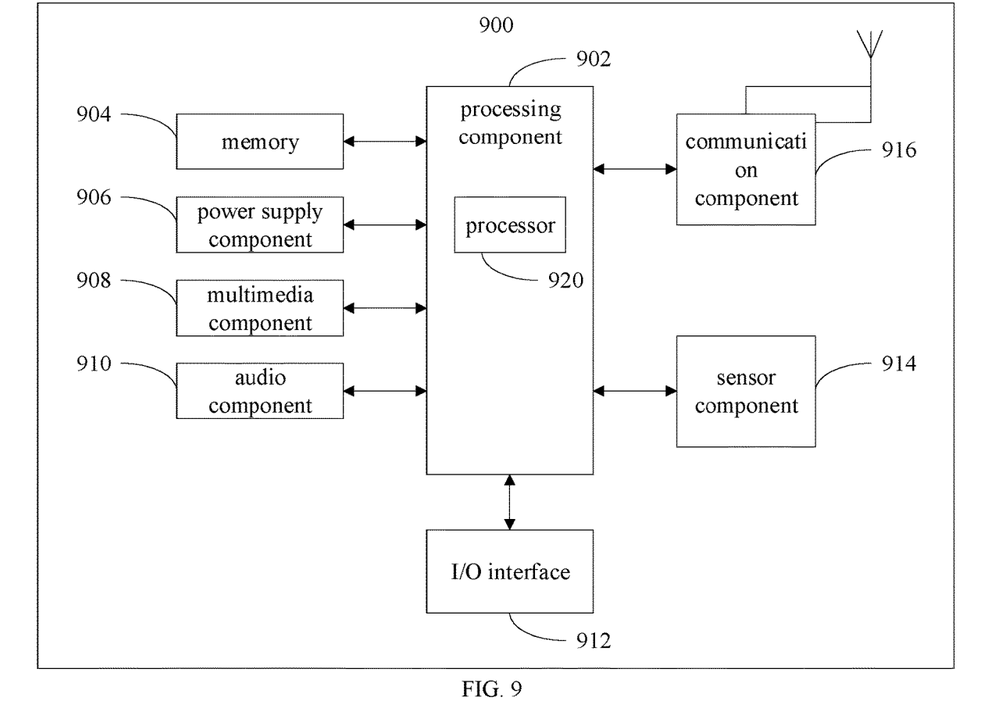
FIG. 9 is a block diagram illustrating a user equipment provided in another embodiment of the present disclosure.

FIG. 9 is a block diagram illustrating a user equipment (UE) 900 according to an embodiment of the present disclosure. For example, the UE 900 may be a mobile phone, a computer, a digital broadcasting terminal equipment, a messaging device, a game console, a tablet device, a medical equipment, a fitness equipment, a personal digital assistant, etc.

As illustrated in FIG. 9, the UE 900 may include at least one component: a processing component 902, a memory 904, a power supply component 906, a multimedia component 908, an audio component 910, an input/output (I/O) of interface 912, a sensor component 914, and a communication component 916.

The processing component 902 generally controls the whole operation of the UE 900, such as operations related to display, phone call, data communication, camera operation and recording operation. The processing component 902 may include one or more processors 920 to perform instructions, to complete all or part of steps of the above method. In addition, the processing component 902 may include at least one module for the convenience of interaction between the processing component 902 and other components. For example, the processing component 902 may include a multimedia module for the convenience of interaction between the multimedia component 908 and the processing component 902.

The memory 904 is configured to store all types of data to support an operation of the UE 900. Examples of the data include the instructions of any applications or methods operated on the UE 900, contact data, phone book data, messages, pictures, videos, etc. The memory 904 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 906 may provide power supply for all components of the UE 900. The power supply component 906 may include a power supply management system, at least one power supply, and other components related to generating, managing and distributing power for the UE 900.

The multimedia component 908 includes a screen of an output interface provided between the UE 900 and the user. In some embodiments, a screen may include a liquid crystal display (LCD) and a touch panel (TP). When the screen includes a touch panel, the screen may be implemented as a touch screen to receive input signals from the user. The touch panel includes at least one touch sensor to sense touching, sliding and gestures on the touch panel. The touch sensor may not only sense the boundary of touch or slide action, but also detect wakeup time and pressure related to the touching or sliding operation. In some embodiments, the multimedia component 908 includes a front camera and/or a rear camera. When the UE 900 is in operation mode, such as a shooting mode or a video mode, the front camera or the rear camera may receive external multimedia data. Each front camera and rear camera may be a fixed optical lens system or an optical lens system with a focal length and an optical zoom capacity.

The audio component 910 is configured as an output and/or input signal. For example, the audio component 910 includes a microphone (MIC). When the UE 900 is in operation mode, such as call mode, record mode, and speech recognition mode, a microphone is configured to receive external audio signals. The audio signals received may be further stored in the memory 904 or sent via the communication component 916. In some embodiments, the audio component 910 further includes a speaker configured to output an audio signal.

The I/O interface 912 provides an interface for the processing component 902 and the peripheral interface module, and the peripheral interface module may be a keyboard, a click wheel, a button, etc. The buttons may include but not limited to a home button, a volume button, a start button and a lock button.

The sensor component 914 includes at least one sensor configured to provide status assessments in all aspects for the UE 900. For example, the sensor component 914 may detect an on/off state of the UE 900 and relative positioning of the component. For example, the component is a display and a keypad of the UE 900. The sensor component 914 may further detect a location change of the UE 900 or one component of the UE 900, presence or absence of contact between the user and the UE 900, an orientation or acceleration/deceleration of the UE 900, and a temperature change of the UE 900. The sensor component 914 may include a proximity sensor, which is configured to detect the existence of the objects nearby without any physical contact. The sensor component 914 may further include a light sensor such as a CMOS or CCD image sensor, which is configured to use in imaging applications. In some embodiments, the sensor component 914 may further include an acceleration transducer, a gyroscope sensor, a magnetic sensor, a pressure sensor or a temperature sensor.

The communication component 916 may be configured for the convenience of wired or wireless communication between the UE 900 and other devices. The UE 900 may access wireless networks based on a communication standard, such as Wi-Fi, 2G or 3G, or their combination. In an example embodiment, the communication component 916 receives broadcast signals or broadcast-related information from an external broadcast management system via a broadcast channel. In an exemplary embodiment, the communication component 916 further includes a near field communication (NFC) module to facilitate short-range communication. For example, an NFC module may be implemented based on a radio frequency identification (RFID) technology, an infrared data association (IRDA) technology, an ultra-wideband (UWB) technology, Bluetooth (BT) technology and other technologies.

In an example embodiment, the UE 900 may be implemented by at least one application specific integrated circuit (ASIC), digital signal processor (DSP), digital signal processing device (DSPD), programmable logic device (PLD), field programmable gate array (FPGA), controller, microcontroller, microprocessor or other electronics components, which is configured to perform the above method.

Figure 10:
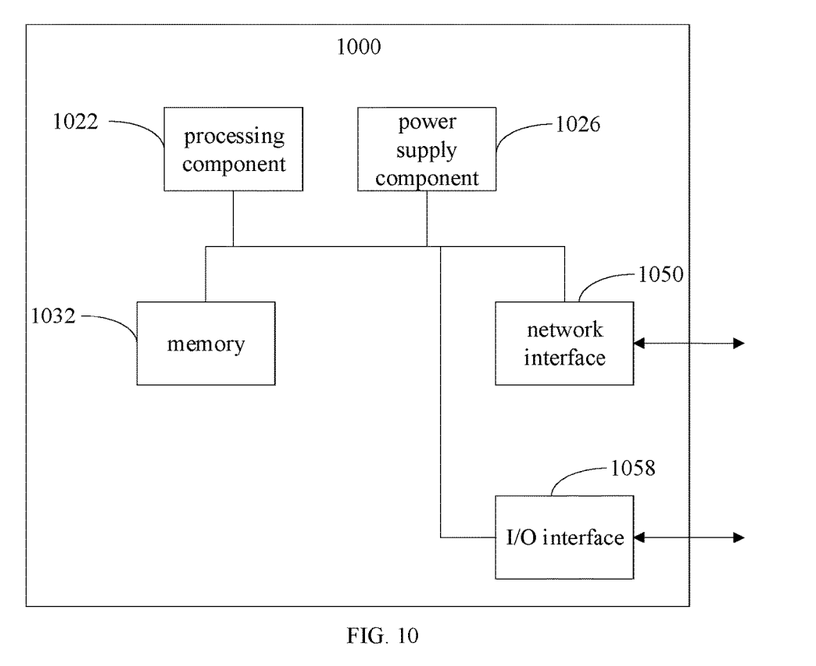
FIG. 10 is a block diagram illustrating a base station provided in an embodiment of the present disclosure.

FIG. 10 is a block diagram illustrating a base station 1000 according to embodiments of the present disclosure. For example, the base station 1000 may be provided as a base station. As illustrated in FIG. 10, a base station 1000 includes a processing component 1011, which further includes at least one processor, and memory resources represented by the memory 1032, which are configured to store instructions executable by the processing component 1022, for example, an application. The application stored in the memory 1032 may include one or more modules each of which corresponds to a set of instructions. In addition, the processing component 1022 is configured to execute instructions, to perform the any method applicable to the base station as described in the above method, for example, the method as illustrated in FIG. 1.

The base station 1000 may further include one power supply component 1026 configured to execute power management of the base station 1000, one wired or wireless network interface 1050 configured to connect the base station 1000 to a network, and one input/output (I/O) interface 1058. The base station 1000 may operate an operating system stored in the memory 1032, for example, Windows Server™, Mac OS X™, Unix™, Linux™, Free BSD™ or similar.

After considering the specification and practicing the disclosure herein, those skilled in the art will easily think of other implementations. The present disclosure is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope and spirit of the present disclosure are given by the appended claims.

It should be understood that the present disclosure is not limited to the precise structure described above and shown in the drawings, and various modifications and changes may be made without departing from its scope. The scope of the present application is only limited by the appended claims.

The invention claimed is:

1. A method for orbital angular momentum (OAM) beam communication, performed by a transmitter, comprising:
   transmitting a reference signal (RS) to a receiver;
   receiving feedback information provided by the receiver based on the RS;
   determining a weight vector corresponding to the transmitter based on the information, wherein the weight vector adjusts a divergence angle of an OAM beam transmitted by the transmitter;
   determining an OAM signal to be transmitted, and adjusting a divergence angle of the OAM signal to be transmitted based on the weight vector to obtain an adjusted OAM beam;
   transmitting the adjusted OAM beam;
   wherein receiving the feedback information provided by the receiver comprises:
   receiving a communication distance between the transmitter and the receiver and a receiving radius of a receiving array at the receiver which are transmitted by the receiver;
   wherein determining the weight vector corresponding to the transmitter based on the information comprises:
   determining an optimal weight vector of the transmitter which matches the receiving array at the receiver based on the communication distance and the receiving radius of the receiving array.

2. The method according to claim 1, wherein the adjusting the divergence angle of the OAM signal to be transmitted based on the weight vector to obtain the adjusted OAM beam comprises:
   determining an actual transmitting signal of each antenna based on the weight vector and a signal to be transmitted of each antenna of each transmitting array;
   generating the adjusted OAM beam by superimposing based on the actual transmitting signal of each antenna.

3. The method according to claim 2, wherein determining the actual transmitting signal of each antenna based on the weight vector and the signal to be transmitted of each antenna of each transmitting array comprises:
  determining the actual transmitting signal of each antenna based on following formula:

$$\widetilde{x_{m,n}} = \sum_{l=-\lfloor\frac{N}{2}\rfloor}^{\lfloor\frac{N}{2}\rfloor-1} w_{l,m} e^{\frac{jl2\pi n}{N}} x_l$$

where $\tilde{x}_{m,n}$ denotes an actual transmitting signal corresponding to an nth antenna of an mth transmitting array at the transmitter, both m and n are positive integers; I denotes an OAM modal value, $$l = -\left\lfloor\frac{N}{2}\right\rfloor, 0, 1, \ldots, \left\lfloor\frac{N}{2}\right\rfloor - 1,$$

and N denotes a number of antennas of the transmitting array at the transmitter; $w_{l,m}$ denotes a weighting coefficient corresponding to the mth transmitting array of the transmitter and an lth modal, $w_{l,m}=e^{j(m-1)\Delta\varphi l}$, φ is determined based on at least one of a communication distance between the transmitter and the receiver, a receiving radius of a receiving array at the receiver, or a modal of the transmitting array at the transmitter, the weight vector is a vector composed of weighting coefficients corresponding to respective transmitting arrays at the transmitter;

$$e^{\frac{jl2\pi n}{N}}$$

denotes an OAM modulation coefficient of the nth antenna, and $x_l$ denotes a data signal to be transmitted.

4. The method according to claim 1, wherein receiving the feedback information provided by the receiver comprises:
  receiving an index value of the weight vector which is transmitted by the receiver.

5. The method according to claim 4, wherein determining the weight vector corresponding to the transmitter based on the information comprises:
  determining a weight vector corresponding to the index value from a pre-established weight vector space based on the index value of the weight vector, wherein the weight vector space comprises: at least one weight vector corresponding to the transmitter under a receiving radius of a receiving array at the receiver, and an index value corresponding to each weight vector.

6. The method according to claim 5, wherein the receiver and the transmitter share the weight vector space.

7. The method according to claim 3, wherein the weighting coefficient comprises at least one of a magnitude or a phase.

8. A method for orbital angular momentum (OAM) beam communication, performed by a receiver, comprising:
  receiving a reference signal (RS) transmitted by a transmitter;
  providing feedback information to the transmitter based on the RS;
  receiving an adjusted OAM beam transmitted by the transmitter;
  wherein providing the feedback information to the transmitter comprises:
    determining a communication distance between the transmitter and the receiver;
    transmitting the communication distance and a receiving radius of a receiving array at the receiver to the transmitter, wherein the communication distance and the receiving radius of the receiving array are configured to determine an optimal weight vector of the transmitter which matches the receiving array at the receiver.

9. The method according to claim 8, wherein the receiver and the transmitter share a weight vector space, wherein the weight vector space comprises: at least one weight vector corresponding to the transmitter under a receiving radius of a receiving array at the receiver, the, and an index value corresponding to each weight vector;
  wherein the weight vector adjusts a divergence angle of an OAM beam transmitted by the transmitter, the weight vector is a vector composed of weighting coefficients corresponding to respective transmitting arrays at the transmitter, a weighting coefficient corresponding to the mth transmitting array of the transmitter and an $l_{th}$ modal is $w_{l,m}=e^{j(m-1)\Delta\varphi l}$, N denotes a number of antennas of a transmitting array at the transmitter; o is determined based on at least one of a communication distance between the transmitter and the receiver, the receiving radius of the receiving array at the receiver, or a modal of the transmitting array at the transmitter.

10. The method according to claim 9, wherein providing the feedback information to the transmitter comprises:
  determining the communication distance between the transmitter and the receiver;
  determining an optimal weight vector corresponding to the transmitter under the receiving radius of the receiving array at the receiver from the weight vector space based on the communication distance between the transmitter and the receiver and the receiving radius of the receiving array;
  transmitting an index value of the optimal weight vector to the transmitter.

11. The method of claim 9, wherein the weighting coefficient comprises at least one of a magnitude or a phase.

12. An apparatus for orbital angular momentum (OAM) beam communication, comprising a transceiver; a memory; a processor, coupled to the transceiver and the memory respectively, configured to:
  transmit a reference signal (RS) to a receiver;
  receive feedback information provided by the receiver based on the RS;
  determine a weight vector corresponding to the transceiver based on the information, wherein the weight vector adjusts a divergence angle of an OAM beam transmitted by the transceiver;
  determine an OAM signal to be transmitted, and adjust a divergence angle of the OAM signal to be transmitted based on the weight vector to obtain an adjusted OAM beam; and
  transmit the adjusted OAM beam;
  wherein the processor is further configured to:
  receive a communication distance between the transmitter and the receiver and a receiving radius of a receiving array at the receiver which are transmitted by the receiver;
  determine an optimal weight vector of the transmitter which matches the receiving array at the receiver based on the communication distance and the receiving radius of the receiving array.

13. An apparatus for orbital angular momentum (OAM) beam communication, comprising a transceiver; a memory; a processor, coupled to the transceiver and the memory respectively, configured to implement the method according to claim 8.

14. A non-transitory computer-readable storage medium having computer executable instructions stored thereon, wherein when the computer executable instructions are performed by a processor, the method according to claim 1 is implemented.

15. A non-transitory computer-readable storage medium having computer executable instructions stored thereon, wherein when the computer executable instructions are performed by a processor, the method according to claim 8 is implemented.

* * * * *